United States Patent
Agnihotri et al.

(10) Patent No.: US 9,926,076 B2
(45) Date of Patent: Mar. 27, 2018

(54) ACCELERATION SMOOTHING HOLDING OVERALL KINETIC ENERGY CONTROL

(71) Applicant: Sikorsky Aircraft Corporation, Stratford, CT (US)

(72) Inventors: Ashok Agnihotri, Southlake, TX (US); Steven D. Weiner, Orange, CT (US); Vineet Sahasrabudhe, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/699,363

(22) Filed: Apr. 29, 2015

(65) Prior Publication Data

US 2015/0314866 A1 Nov. 5, 2015

Related U.S. Application Data

(60) Provisional application No. 61/987,112, filed on May 1, 2014.

(51) Int. Cl.
| | | |
|---|---|---|
| *B64C 11/00* | (2006.01) | |
| *B64C 27/57* | (2006.01) | |
| *B64C 19/00* | (2006.01) | |
| *G05D 1/08* | (2006.01) | |

(52) U.S. Cl.
CPC ............. *B64C 27/57* (2013.01); *B64C 19/00* (2013.01); *G05D 1/0858* (2013.01)

(58) Field of Classification Search
CPC ...... B64C 27/57; B64C 19/00; G05D 1/0808; G05D 1/0825; G05D 1/0833; G05D 1/0858; G05D 1/0066; G05D 1/102

USPC ........ 244/17.13, 193, 76 R, 174, 191; 701/3, 701/4, 5, 8, 10
See application file for complete search history.

(56) References Cited

U.S. PATENT DOCUMENTS

| | | | |
|---|---|---|---|
| 6,873,887 B2 * | 3/2005 | Zagranski | ............... B64C 27/12 244/6 |
| 7,908,044 B2 | 3/2011 | Piasecki et al. | |
| 8,231,085 B2 | 7/2012 | Cherepinsky | |
| 8,298,120 B2 | 10/2012 | Sato et al. | |
| 2009/0084908 A1 * | 4/2009 | Wildschek | ........... G05D 1/0066 244/76 R |
| 2010/0017048 A1 * | 1/2010 | Sahasrabudhe | ...... G05D 1/0858 701/3 |

(Continued)

FOREIGN PATENT DOCUMENTS

| | | |
|---|---|---|
| JP | H4203231 A | 7/1992 |
| WO | 2009025909 A2 | 2/2009 |

OTHER PUBLICATIONS

Extended European Search Report; for EP Application No. 15165699.8; dated Feb. 23, 2016; 9 Pages.

(Continued)

*Primary Examiner* — Richard G Davis
(74) *Attorney, Agent, or Firm* — Cantor Colburn LLP

(57) ABSTRACT

A method and system for controlling maneuverability of an aircraft includes receiving one or more signals indicative of commanded peak rotary acceleration at a first timeperiod; determining a signal indicative of an actual peak rotary acceleration for the first timeperiod in response to the receiving of the one or more signals for commanded pilot acceleration; and determining signals indicative of actual rotary acceleration for a second timeperiod.

10 Claims, 4 Drawing Sheets

(56) References Cited

U.S. PATENT DOCUMENTS

2011/0057071 A1* 3/2011 Sahasrabudhe ...... G05D 1/0858
                                                    244/17.13
2013/0060406 A1* 3/2013 Christensen ........... G05D 1/102
                                                    701/4

OTHER PUBLICATIONS

Pavel, Marilena D., "Rotorcraft Design for Maximized Performance at Minimized Vibratory Loads"; Sep. 9, 2011; Retrieved From the Internet: URL: https://www.researchgate.net/publication/221916281_Rotorcraft_Design_for_Maximized_Performance_at_Minimize.
EP Communication Pursuant to Article 94(3) EPC; Application No. 15 165 699.8-1802; Date: Apr. 3, 2017, pp. 1-7.

* cited by examiner

ACCELERATION SMOOTHING HOLDING OVERALL KINETIC ENERGY CONTROL

CROSS-REFERENCE TO RELATED APPLICATIONS

This application claims the benefit of U.S. provisional patent application Ser. No. 61/987,112, filed May 1, 2014, the entire contents of which are incorporated herein by reference.

BACKGROUND

The subject matter disclosed herein relates generally to the field of rotary-wing aircraft and, more particularly, to a system and method for control of the aircraft by modifying commanded peak acceleration in order to reduce design and fatigue loads on the rotorcraft while maintaining agility and maneuverability.

DESCRIPTION OF RELATED ART

In a typical rotorcraft, pilot commanded rotary acceleration (i.e., commands in yaw, pitch and roll) is shaped by a model following control system for rate and attitude displacement commands. Rotary acceleration on a rotorcraft imposes proportional design and fatigue loads on the aircraft during flight as Acceleration=Force (load)/Mass. Transient design maneuvers impose high spikes in acceleration during initiation and termination of the maneuver. These spikes result in high spikes in loads. Design and fatigue loads in a rotorcraft determine the required strength and structural weight. So, a significant reduction in peak acceleration provides significant load reduction. A system to modify the pilot commanded acceleration while producing similar agility in the rotorcraft would be well received in the art.

BRIEF SUMMARY

According to one aspect of the invention, a method for controlling maneuverability of an aircraft, includes receiving, with a processor, one or more signals indicative of commanded peak rotary acceleration at a first timeperiod; determining, with the processor, a signal indicative of an actual peak rotary acceleration for the first timeperiod in response to the receiving of the one or more signals for commanded pilot acceleration; and determining, with the processor, signals indicative of actual rotary acceleration for a second timeperiod.

In addition to one or more of the features described above, or as an alternative, further embodiments could include an actual peak rotary acceleration that comprises control limiting the commanded peak rotary acceleration at a predetermined percentage.

In addition to one or more of the features described above, or as an alternative, further embodiments could include maintaining the actual rotary acceleration for a greater duration than a commanded rotary acceleration.

In addition to one or more of the features described above, or as an alternative, further embodiments could include holding overall kinetic energy the same for the commanded rotary acceleration and the actual rotary acceleration.

In addition to one or more of the features described above, or as an alternative, further embodiments could include outputting a slower rate of change of the actual rotary acceleration than the commanded rotary acceleration for a longer duration.

In addition to one or more of the features described above, or as an alternative, further embodiments could include determining the actual rotary acceleration as a function of overall kinetic energy of the aircraft.

According to one aspect of the invention, a system for controlling maneuverability of an aircraft includes one or more sensors configured to determine an aircraft attitude and rate; one or more controllers configured to issue displacement commands during a flight maneuver; a computer operably connected to the one or more controllers and configured to: receive one or more signals indicative of commanded peak rotary acceleration at a first timeperiod; determine a signal indicative of an actual peak rotary acceleration for the first timeperiod in response to the receiving of the one or more signals for commanded pilot acceleration; and determine signals indicative of actual rotary acceleration for a second timeperiod.

In addition to one or more of the features described above, or as an alternative, further embodiments could include wherein the processor is configured to control limit the commanded peak rotary acceleration at a predetermined percentage.

In addition to one or more of the features described above, or as an alternative, further embodiments could include a processor that is configured to maintain the actual rotary acceleration for a greater duration than a commanded rotary acceleration.

In addition to one or more of the features described above, or as an alternative, further embodiments could include a processor that is configured to hold overall kinetic energy the same for the commanded rotary acceleration and the actual rotary acceleration.

In addition to one or more of the features described above, or as an alternative, further embodiments could include a processor that is configured to output a slower rate of change of the actual rotary acceleration than the commanded rotary acceleration for a longer duration.

In addition to one or more of the features described above, or as an alternative, further embodiments could include a processor that is configured to determine the actual rotary acceleration as a function of overall kinetic energy of the aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
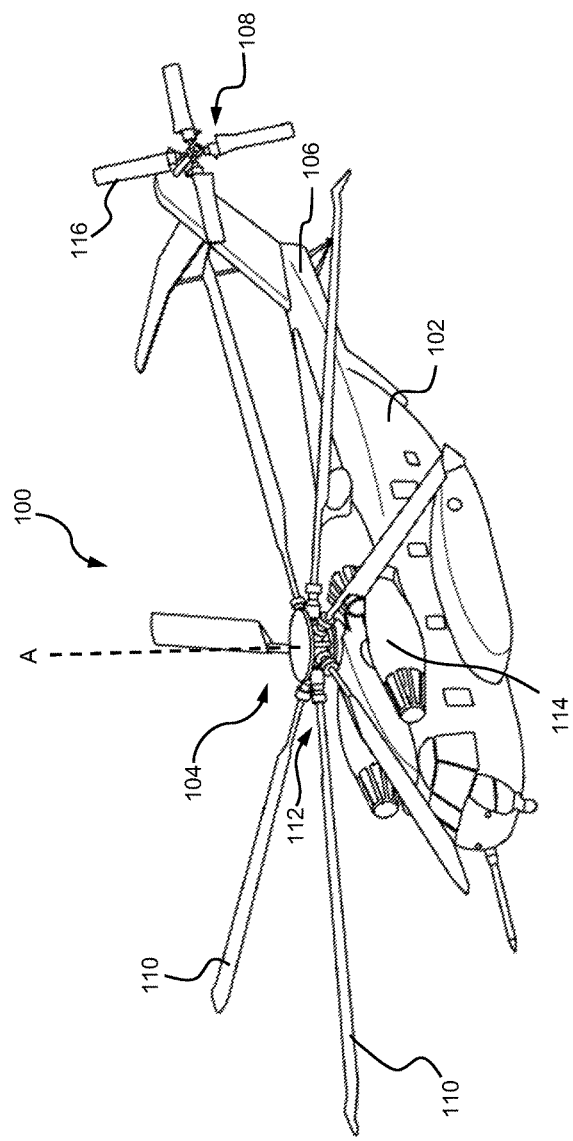
FIG. 1 is a perspective view of an exemplary rotary wing aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with embodiments of the invention. As illustrated, the rotary-wing aircraft 100 includes an airframe 102 having a main rotor assembly 104 and an extending tail 106 which mounts an anti-torque system, such as a tail rotor assembly 108. In embodiments, the anti-torque system may include a translational thrust system, a pusher propeller, a rotor propulsion system or the like. The main rotor assembly 104 includes a plurality of rotor blades 110 mounted to a rotor hub 112 that rotates about axis A. Also, tail rotor assembly 108 includes a plurality of rotor blades 116. The main rotor assembly 104 and the tail rotor assembly 108 are driven to rotate by one or more engines 114 through one or more gearboxes (not shown). Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
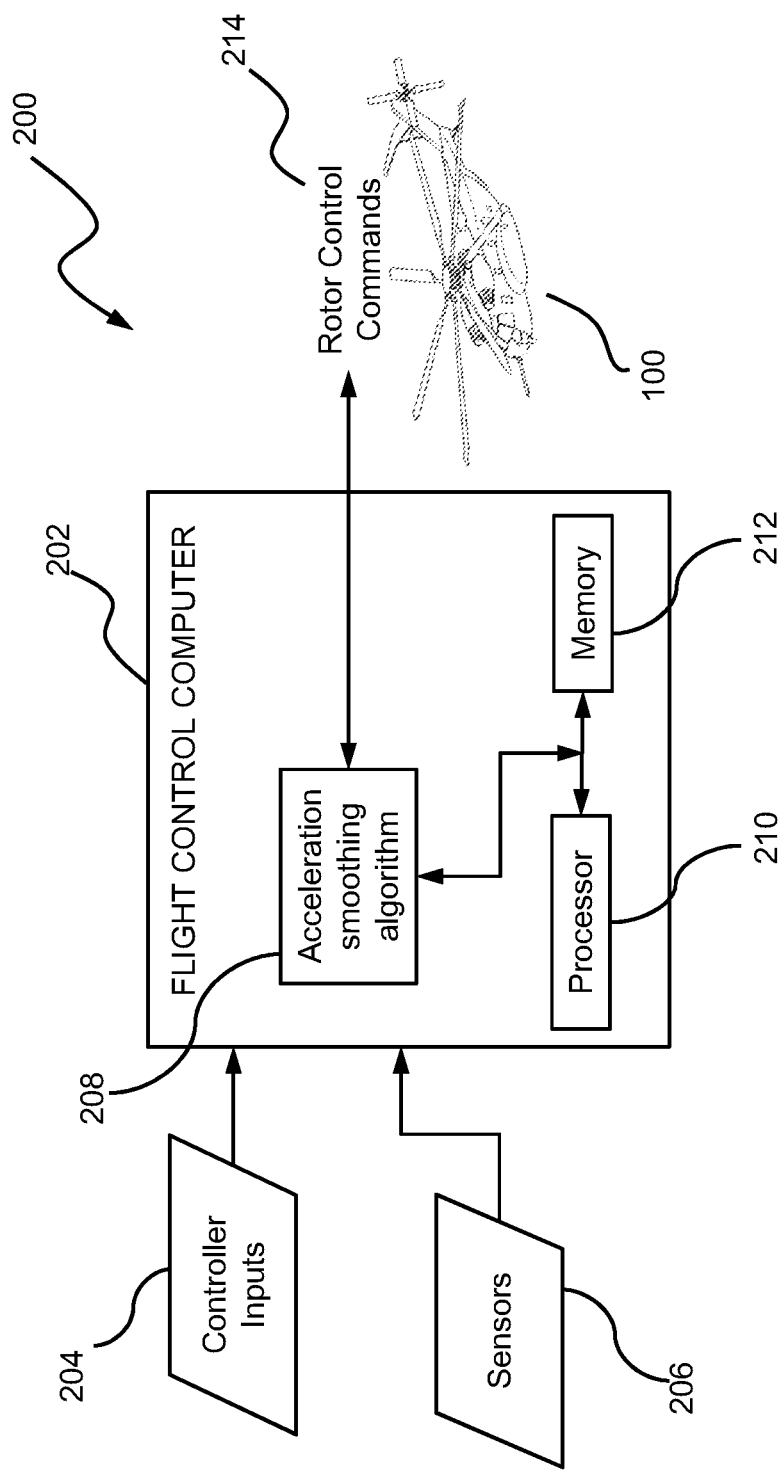
FIG. 2 is a schematic view of an exemplary system for implementing an acceleration smoothing algorithm according to an embodiment of the invention.

FIG. 2 illustrates a schematic block diagram of a fly-by-wire (FBW) flight control system 200 (also referred to as FBW system 200) for the rotary-wing aircraft 100 according to an exemplary embodiment. As illustrated, the FBW system 200 implements an acceleration smoothing algorithm 208 which shapes the pilot's controller and displacement commands and produces a desired stability response and flight augmentation. The FBW system 200 includes a model following control law which shapes controller displacement commands through an inverse vehicle model to produce the desired aircraft response. The FBW system 200 processes controller inputs 204 and sensor data and transmits the resultant signals to the aircraft 100 primary servos. In an embodiment, the FBW system 200 may provide modified angular rate and angular attitude commands in order to produce a desired rotary acceleration on the aircraft 100 for a longer duration while producing the same agility in the aircraft 100. The FBW system 200 includes a computing system such as a flight control computer (FCC) 202. The FCC 202 receives pilot command signals of the controller inputs 204 and sensed parameter signals from a plurality of sensors 206 including operating conditions such as lateral acceleration, angular attitude and angular rate as well as magnitude and direction of wind speed relative to the rotary-wing aircraft 100 in order to produce the desired stability response and flight augmentation. The controller inputs 204 may take various forms including sidearm controllers, a yaw pedal system or other such flight controllers.

In an embodiment, the FCC 202 receives sensed information such as, for example, a magnitude of the wind relative to the rotary-wing aircraft 100, a direction of the wind relative to rotary-wing aircraft 100, lateral acceleration, aircraft attitude, and aircraft angular rate from sensors 206 and interprets displacement positions of the controller inputs 204 based on pilot commanded rotary acceleration in order to determine peak acceleration command signals in order to achieve similar peak velocity for implementation on aircraft 100. Also shown in FIG. 2, the FCC 202 includes a memory 212. The memory 212 stores the acceleration smoothing algorithm 208 as executable instructions that are executed by a processor 210. The instructions may be stored or organized in any manner and at any level of abstraction, such as in connection with the execution of the acceleration smoothing algorithm 208. The processor 210 may be any type of processor (CPU), including a general purpose processor, a digital signal processor, a microcontroller, an application specific integrated circuit, a field programmable gate array or the like. Also, in embodiments, memory 212 may include random access memory (RAM), read only memory (ROM), or other electronic, optical, magnetic or any other computer readable medium onto which is stored the acceleration smoothing algorithm described below.

In an embodiment, the flight control computer 202 receives commanded peak rotary acceleration from controller inputs 204 and implements, through algorithm 208, an acceleration limiting to reduce the peak acceleration by, e.g., 40 percent. The algorithm 208 also provides a modified rotary acceleration command that extends the rotary acceleration for a longer duration in order to reach similar peak velocity in approximately the same timeperiod, thereby maintaining maneuverability and agility. Another embodiment includes extending the duration of the rotary acceleration when the controller input 204 is not commanding rotary acceleration in order to hold overall kinetic energy the same and produce maneuverability in the aircraft 100.

Figure 3:
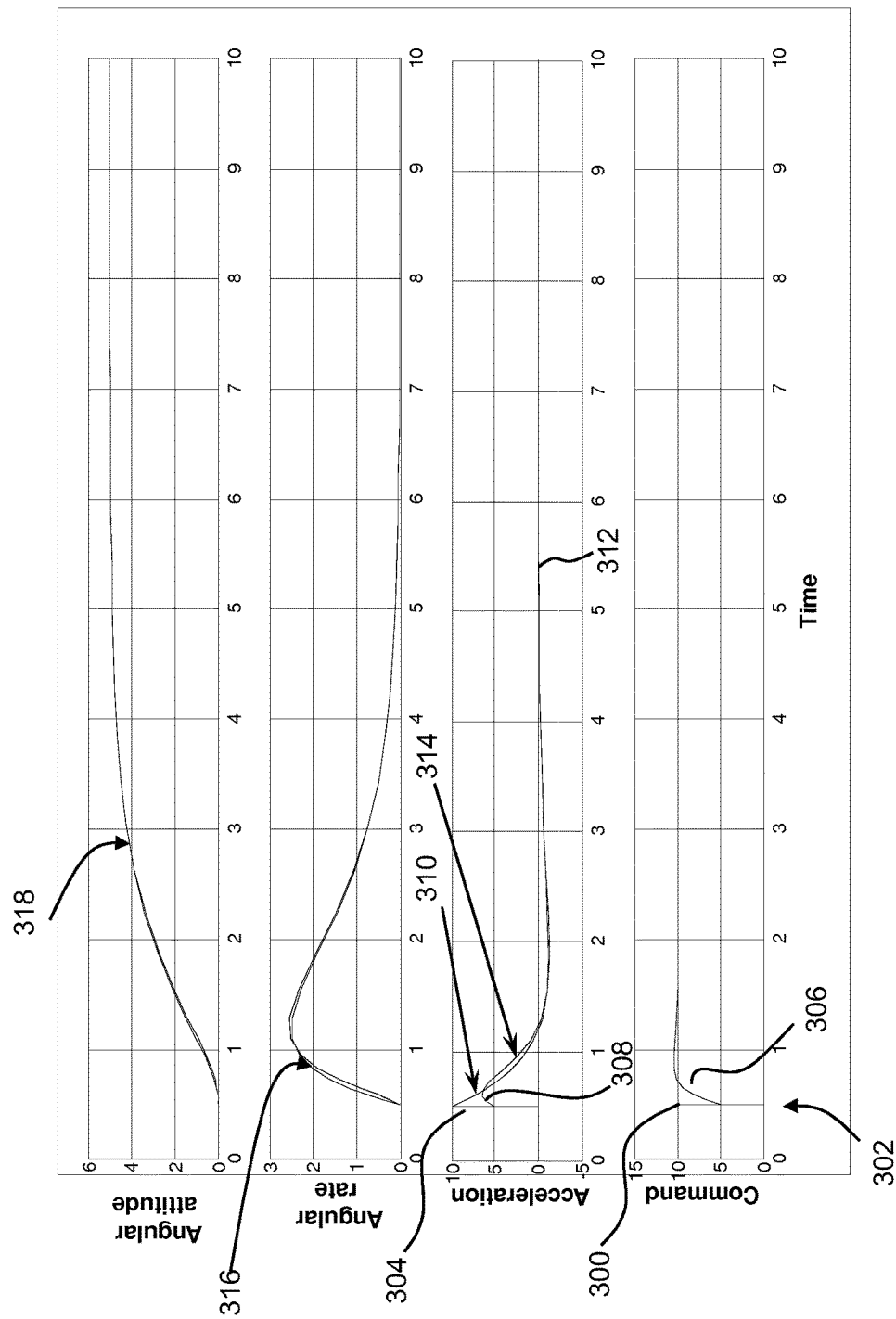
FIG. 3 is a graph showing acceleration control according to an embodiment of the invention.

FIG. 3 is a graph shown acceleration smoothing that is implemented by the flight control computer 202 (FIG. 2) according to an embodiment of the invention. Initially, pilot commanded rotary acceleration input 300 is received at time period 302. The commanded acceleration input 300 is associated with commanded peak acceleration 304. The flight control computer 202 (FIG. 2) determines an actual rotary acceleration command 306 that is associated with an actual peak rotary acceleration 308. In an embodiment, the actual peak acceleration 308 is reduced by 40 percent although other percentage reductions are permissible. As the commanded acceleration follows the commanded rotary acceleration curve 310 towards steady-state acceleration 312, the acceleration smoothing algorithm 212 receives the sensed acceleration of aircraft 100 from sensors 206 and determines the actual rotary acceleration moving forward in time. The algorithm 212 (FIG. 2) outputs the actual rotary acceleration 314 for a longer duration than commanded rotary acceleration 310 which provides for a similar peak velocity for the aircraft 100 (FIG. 1) in approximately the same timeperiod, similar angular rate 316 and a similar angular attitude 318.

Figure 4:
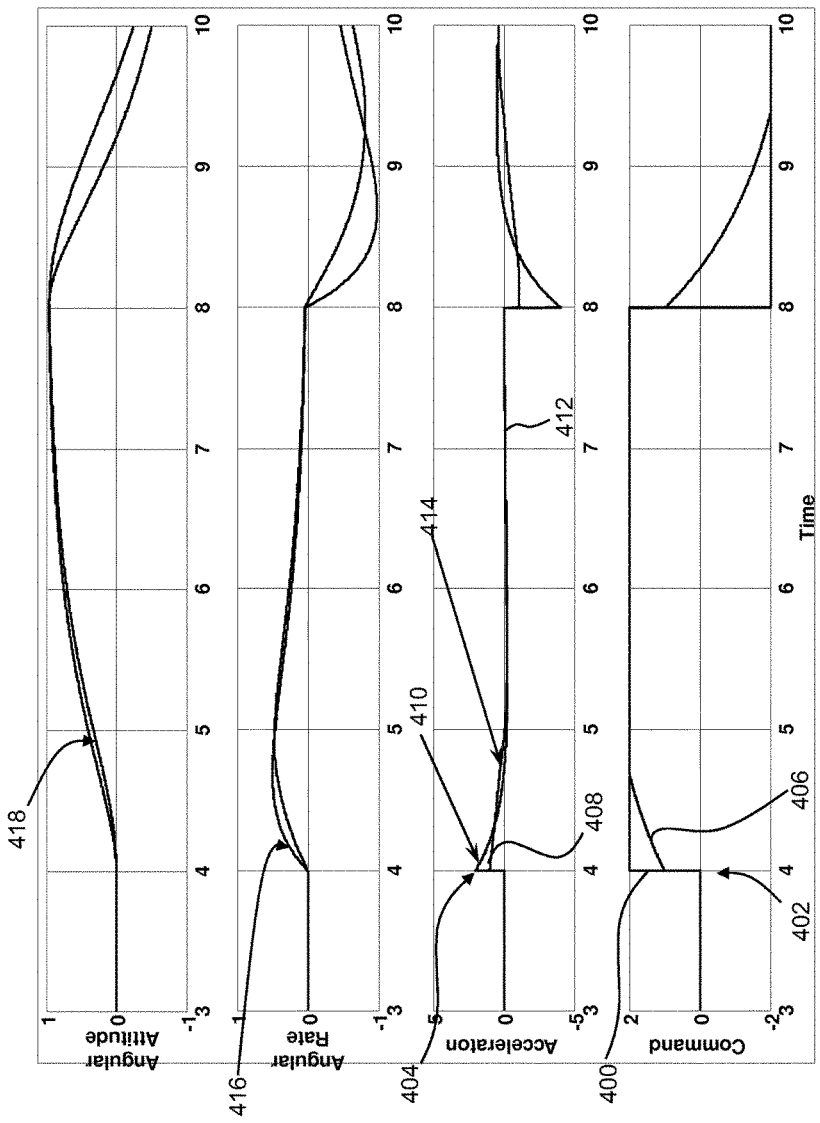
FIG. 4 is a graph showing acceleration control according to an embodiment of the invention.

FIG. 4 is a graph shown acceleration smoothing that is implemented by forward limiting the actual peak acceleration according to an embodiment of the invention. Initially, pilot commanded rotary acceleration inputs 400 are received at time period 402. The commanded acceleration input 400 is associated with commanded peak acceleration 404. The flight control computer 202 (FIG. 2) determines an actual rotary acceleration command 406 that is associated with an actual peak rotary acceleration 408. The acceleration smoothing algorithm 212 (FIG. 2) provides control limiting for sudden/rapid maneuvers by limiting peak acceleration and the remainder of control input is allowed slowly. As the commanded acceleration follows the commanded rotary acceleration curve 410 towards steady-state acceleration 412, the acceleration smoothing algorithm 212 (FIG. 2) receives the sensed acceleration of aircraft 100 from sensors 206 (FIG. 2) and determines the actual rotary acceleration moving forward in time in order to hold overall kinetic energy the same. The algorithm 212 (FIG. 2) outputs a slower rate of change of actual commanded rotary acceleration following curve 414 than commanded rotary acceleration 410 for a longer duration which provides that the overall kinetic energy under the curve remains the same for curve 410 and curve 414. Further, the result of the modifying the commanded acceleration is an area for commanded rotary acceleration 410 that is the same as the area for the actual rotary acceleration thereby holding overall kinetic energy the same, a similar angular rate 416 and a similar angular attitude 418.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling maneuverability of an aircraft, comprising:
    receiving, with a processor, one or more signals indicative of commanded peak rotary acceleration at a first timeperiod;
    determining, with the processor, a signal indicative of an actual peak rotary acceleration for the first timeperiod in response to the receiving of the one or more signals for commanded pilot acceleration;
    determining, with the processor, signals indicative of actual rotary acceleration for a second timeperiod, the second timeperiod being forward in time relative to the first timeperiod; and
    outputting the actual rotary acceleration for the second timeperiod such that at least one parameter of the actual rotary acceleration is output for a longer duration than a commanded rotary acceleration, wherein the maneuverability of the aircraft is the same at the first timeperiod and the second timeperiod.

2. The method of claim 1, wherein the actual peak rotary acceleration further comprises control limiting the commanded peak rotary acceleration at a predetermined percentage.

3. The method of claim 1, further comprising holding overall kinetic energy the same for the commanded rotary acceleration and the actual rotary acceleration.

4. The method of claim 1, further comprising outputting a slower rate of change of the actual rotary acceleration than the commanded rotary acceleration for a longer duration.

5. The method of claim 1, further comprising determining the actual rotary acceleration as a function of overall kinetic energy of the aircraft.

6. A control system for controlling maneuverability of an aircraft, comprising:
    one or more sensors configured to determine an aircraft attitude and rate;
    one or more controllers configured to issue displacement commands during a flight maneuver;
    a computer operably connected to the one or more controllers and configured to: receive one or more signals indicative of commanded peak rotary acceleration at a first timeperiod;
    determine a signal indicative of an actual peak rotary acceleration for the first timeperiod in response to the receiving of the one or more signals for commanded pilot acceleration;
    determine signals indicative of actual rotary acceleration for a second timeperiod, the second timeperiod being forward in time relative to the first timeperiod; and,
    outputting the actual rotary acceleration for the second timeperiod such that at least one parameter of the actual rotary acceleration is output for a longer duration than a commanded rotary acceleration, wherein the maneuverability of the aircraft is the same at the first timeperiod and the second timeperiod.

7. The control system of claim 6, wherein the processor is configured to control limit the commanded peak rotary acceleration at a predetermined percentage.

8. The control system of claim 6, wherein the processor is configured to hold overall kinetic energy the same for the commanded rotary acceleration and the actual rotary acceleration.

9. The control system of claim 6, wherein the processor is configured to output a slower rate of change of the actual rotary acceleration than the commanded rotary acceleration for a longer duration.

10. The control system of claim 6, wherein the processor is configured to determine the actual rotary acceleration as a function of overall kinetic energy of the aircraft.

* * * * *